(12) United States Patent
Weiss et al.

(10) Patent No.: US 9,925,633 B2
(45) Date of Patent: Mar. 27, 2018

(54) APPARATUS FOR COOLING MACHINE COMPONENTS USING PHASE-CHANGE MATERIAL

(71) Applicant: Step-Tec AG, Luterbach (CH)

(72) Inventors: Lukas Weiss, Basel (CH); Simon Zuest, Winterthur (CH); Ludger Josef Fischer, Zug (CH); Joerg Worlitschek, Lucerne (CH); Edwin Reinhard, Niederoenz (CH)

(73) Assignee: Step-Tec AG (CH)

( * ) Notice: Subject to any disclaimer, the term of this patent is extended or adjusted under 35 U.S.C. 154(b) by 85 days.

(21) Appl. No.: 14/721,885

(22) Filed: May 26, 2015

(65) Prior Publication Data
US 2015/0343588 A1 Dec. 3, 2015

(30) Foreign Application Priority Data
May 27, 2014 (EP) .................................... 14170049

(51) Int. Cl.
| | | |
|---|---|---|
| *F28D 15/00* | (2006.01) | |
| *B23Q 11/12* | (2006.01) | |
| *B23Q 1/70* | (2006.01) | |
| *B23Q 11/14* | (2006.01) | |
| *H02K 9/19* | (2006.01) | |

(52) U.S. Cl.
CPC ............. *B23Q 11/127* (2013.01); *B23Q 1/70* (2013.01); *B23Q 11/141* (2013.01); *F28D 15/00* (2013.01); *H02K 9/19* (2013.01); *Y10T 82/2552* (2015.01); *Y10T 409/303976* (2015.01)

(58) Field of Classification Search
CPC ...... B23Q 11/127; B23Q 11/141; B23Q 1/70; H02K 9/19; F28D 15/00; Y10T 409/303976; Y10T 82/2552
USPC ............. 62/434; 165/104.19, 104.21, 104.22, 165/104.33
See application file for complete search history.

(56) References Cited

U.S. PATENT DOCUMENTS

| | | | |
|---|---|---|---|
| 5,141,079 A | 8/1992 | Whitney et al. | |
| 5,277,038 A * | 1/1994 | Carr ................... | B60H 1/00492 165/10 |
| 2004/0117919 A1* | 6/2004 | Conrad ............... | C11D 11/0064 8/137 |
| 2005/0057102 A1* | 3/2005 | Totsu .................. | G03F 7/70758 310/12.06 |
| 2009/0211249 A1* | 8/2009 | Wohrer ..................... | F01K 3/00 60/641.8 |

(Continued)

FOREIGN PATENT DOCUMENTS

| | | |
|---|---|---|
| DE | 10 2012 020 958 A1 | 4/2014 |
| EP | 0376178 A1 | 7/1990 |

(Continued)

*Primary Examiner* — Claire Rojohn, III
(74) *Attorney, Agent, or Firm* — Harness, Dickey & Pierce, P.L.C.

(57) ABSTRACT

The invention relates, on the one hand, to a machine element (6), for example a motor spindle or an electromechanical drive unit, with integrated, internal cooling system (8) and, on the other hand, to a closed cooling circuit (24) with corresponding machine element (6). According to the invention, the cooling takes place with a special coolant (4). The coolant (4) is a dispersion containing at least one Phase Change Material (PCM).

24 Claims, 2 Drawing Sheets

(56) References Cited

U.S. PATENT DOCUMENTS

| | | | |
|---|---|---|---|
| 2012/0111036 A1* | 5/2012 | Campbell | F25B 25/005 62/115 |
| 2012/0125573 A1* | 5/2012 | Rubenstein | F28D 15/00 165/104.33 |
| 2013/0271913 A1* | 10/2013 | MacDonald | F28D 15/00 361/679.52 |
| 2014/0260361 A1* | 9/2014 | Rodier | F25D 21/12 62/80 |

FOREIGN PATENT DOCUMENTS

| | | |
|---|---|---|
| EP | 0987799 A2 | 3/2000 |
| EP | 1252970 A1 | 10/2002 |
| EP | 1927431 A1 | 6/2008 |
| EP | 2073952 A1 | 7/2009 |
| EP | 2375483 A2 | 10/2011 |
| WO | WO-2008-044256 A1 | 4/2008 |

* cited by examiner

APPARATUS FOR COOLING MACHINE COMPONENTS USING PHASE-CHANGE MATERIAL

BACKGROUND

Technical Field

The present invention relates to a machine element, in particular a motor spindle or an electromechanical drive unit, with integrated, internal cooling system and to a closed cooling circuit containing a machine element with an integrated, internal cooling system.

Discussion

Great importance is today attached to the cooling of machine components in machine tools. Modern machine tools have high precision and, in mould making, in particular, the requirements placed upon the machine tool and the therein installed motor spindles—above all, on the main spindle of a milling head—have risen massively in recent years. The quality of the surface machining of a workpiece is substantially impaired by vibrations of the working spindle, the machining process, and by the temperature behaviour of the motor spindle and of the machine frame. In respect of the vibrations generated, inter alia, by the material-removing machining of the workpiece, a great deal has been undertaken in recent years, so that the high performance spindles nowadays meet the requirements.

In terms of thermal behaviour, on the other hand, a limit has been reached with the known cooling options. An ideally conditioned spindle exhibits a constant temperature and a homogeneous temperature distribution within the spindle and across all operating states. The reality looks different, however: spindles have during operation localized heat sources, which lead to a non-homogeneous heat input. Typical heat sources within a spindle are in this context the bearings (friction) and the motor (Cu, Fe, supplementary and harmonic losses). These warm the real motor spindle unevenly, whereby a non-homogeneous temperature distribution is obtained within the spindle. The temperature here varies both in the circumferential direction (so-called polar temperature distribution) and in the axial direction.

The inhomogeneity of the temperature distribution can in motor spindles familiarly be reduced with a cooling system, which system should also ensure a constant temperature at different load. However, known cooling systems, above all in respect of precision spindles, are not capable of keeping the temperature differences sufficiently low. This limited capability of known cooling systems currently poses a major problem.

The machine elements installed in machines, in particular machine tools, are in certain cases cooled or thermally stabilized with cooling systems which have a closed cooling circuit. As already mentioned, the cooling is effected for various reasons:

The machine element produces waste heat which must necessarily be removed in order to secure the working of the element. Otherwise the element would directly fail due to overheating, or the efficiency, useful power or working life would be severely reduced.

The machine element must also, however, be thermally stabilized so as to be able to correctly fulfil its function—for example the machining of a workpiece. This is particularly true of precision-relevant components of a spindle, which are generally made of steel and, due to their thermal expansion upon changes in temperature, change their dimensions.

Since machine elements of a machine tool must generally be warmed to operating temperature only in a start-up phase, during running operation the cooling function remains dominant. In the following, for simplification purposes, reference is made to a cooling circuit, even if this serves not only for the pure unregulated cooling, but also for the temperature stabilization of the machine element (i.e. the cooling capacity is adapted to the quantity of heat to be removed). Furthermore, such a cooling circuit also influences the temperature distribution within a machine, that is to say between the various machine elements (for example milling head, bearings of the milling head, and machine frame in the region of the milling head). This is not examined in detail below, but simplistically it can be said that the best state is ensured if all machine elements and all subcomponents] within a machine tool have the same (operating) temperature. This temperature is referred to below as the target temperature. The solutions which are described below can, where necessary, be analogously adapted for other cases. This target temperature lies in the region of the room temperature, often a few degrees K higher (for instance, 24° C. are customary), in order that the convection with the ambient air tends to ensure a low heat flow into the environment, and not the other way round, that the machine cooling cools the room. For simplification purposes, it is assumed below that the target temperature lies above the ambient temperature, though, in the reverse case, the statements can be adapted analogously.

As is known, a closed cooling circuit comprises at least one heat source, one heat sink, and a pipe system in which a cooling medium circulates between the heat source and the heat sink. This circulation is generally enforced by a pump. As a suitable cooling medium, a water-based coolant is often used, since it has a low viscosity and a high specific heat capacity. The flow rate of the cooling medium is limited, however, by the design of the heat source (for example size of the spindle). Above a certain range, an increase in the heat removal is therefore only possible by increasing the heat capacity of the cooling medium. A low viscosity here additionally facilitates the circulation. A low flow rate and low viscosity of the cooling medium is advantageous, moreover, because the dimensioning of the pipes and of the pump thereby turns out to be smaller and, in the heat transfer at the heat sink or the heat source, a smaller necessary contact surface is required. By way of example, water is often simplistically specified as the cooling medium, even if, according to application and for specific reasons, this can also be a different liquid.

Figure 1:
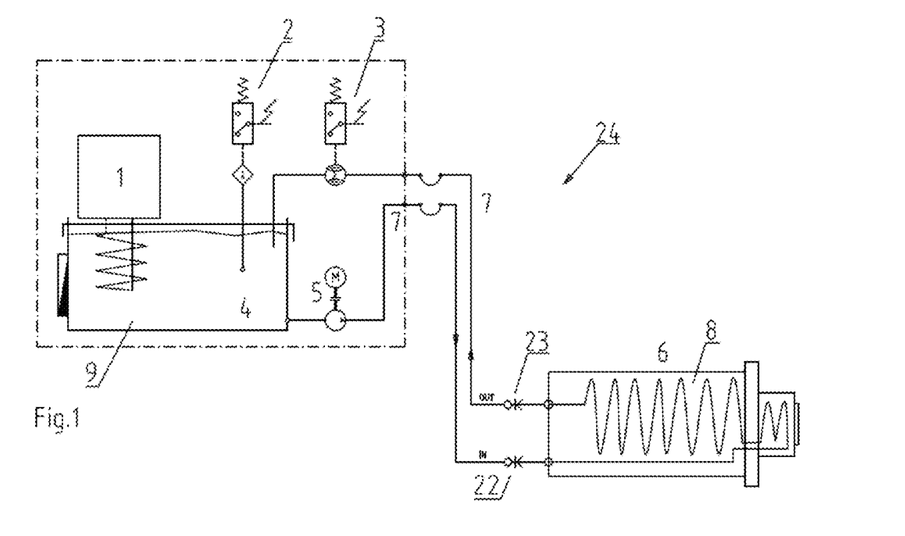
FIG. 1 is a schematic representation of a spindle cooling system with a closed cooling circuit.

FIG. 1 shows in schematic representation the working method of a spindle cooling system with closed cooling circuit 24. The motor spindle 6 (heat source) to be cooled is cooled by means of a cooling medium or coolant 4 (for example water), which, driven by a coolant pump 5, flows through cooling lines 7 into the internal cooling system 8—in this case cooling lines arranged helically around the circumference of the motor spindle 6. The warmed cooling medium 4 which exits the built-in spindle cooling apparatus or internal cooling system 8 flows, for its part, again via cooling lines 7 back into a reservoir (heat sink) 9, where the heat is again extracted from the cooling medium 4. This heat extraction is effected in the reservoir of the heat sink 9 by a cooling compressor 1, which is regulated by means of a temperature monitor 2, which cools the cooling medium, for instance, to 24° C. The cooling compressor 1 itself can here have a lower temperature than 24° C. In the represented closed cooling circuit 24 of FIG. 1, a flow monitor with signalling contact 3 is additionally built in.

Figure 2:
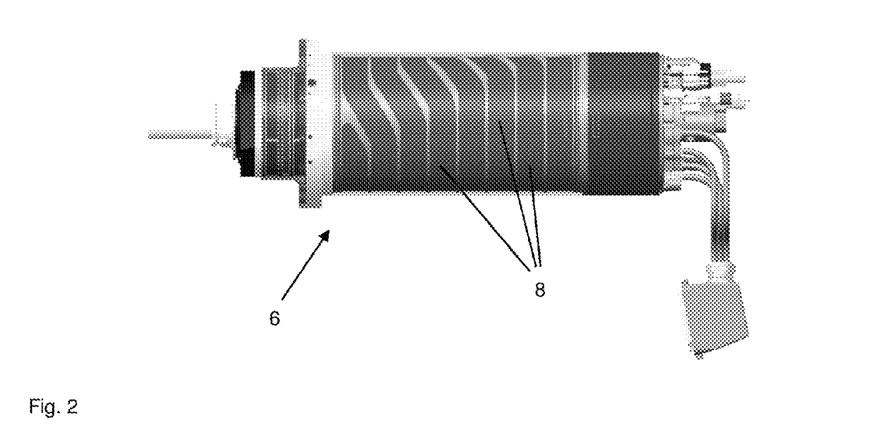
FIG. 2 is a side view of a spindle.

FIG. 2 shows, furthermore, how the cooling lines of an internal cooling system 8 could actually be arranged in a motor spindle.

It is commonly known to provide cooling apparatuses in machine tools. Thus, EP1252970A1, for instance, discloses how, in a machine tool having a closed hood, with the incorporation of cooling circuits and heat convection by the air, the fundamental elements of the machine can advantageously be brought closer to a reference temperature.

Publication EP 376 178 A1 sets out how a motor spindle in a machine tool is designed with a cooling system with gaseous cooling medium in order to be able obtain sufficient cooling. The topic of temperature differences between the forward circuit and the return circuit is not raised in the document.

EP 1 927 431 A1 shows an advantageous design of the heat sink for a spindle cooling system with which the forward circuit temperature of the cooling medium for the spindle can be regulated within narrow limits. From this document can be seen the high level of complexity which is associated with temperature stabilization in a conventional cooling system.

In cooling systems constructed in this way, the naturally limited heat capacity of the cooling medium limits the heat removal and further functions of the cooling system for several reasons:

In the first place, cooling mediums react "sensitively", i.e. the absorbed heat increases the temperature of the medium in inverse proportion to the heat capacity of the medium. When cooling medium enters the heat source, the temperature is inevitably lower than when it exits. It is therefore not possible to stabilize with a cooling circuit a plurality of heat sources in series (cf. FIG. 2) at the same temperature, especially not if they behave in a time-variable manner. A spindle or a machine element frequently, however, has more than one heat source (for example on the front or rear bearing or on the windings in the middle region of the spindle), wherein ideally all regions of the machine element should be stabilized at the same temperature. This drawback can be alleviated with a parallel connection, but this gives rise to further problems, such as the steering of the flow through the various parallel branches of the cooling network. Irrespective of parallel or serial connection of the cooling circuits, the number of existing heat sources, or the mass flow of the guided cooling medium: A machine element can never by these measures be kept isothermal in terms of time and location—i.e. the element has the same and constant temperature everywhere.

In the second place, the heat flow from the heat source to the cooling medium is dependent on the temperature difference. If the temperature of the source rises due to a higher generated heat quantity (for example due to higher motor output), then, as a consequence of the local heat absorption, the temperature of the cooling medium also rises (the cooling medium thus reacts sensitively). As a result of this temperature rise, the temperature difference between the heat source and the cooling medium declines and the heat flow is thereby lessened, the cooling capacity consequently has a tendency to decline, and this in cases and at locations in which specifically more cooling capacity would be demanded.

In the third place, the cooling capacity is substantially dependent on the flow of the cooling medium. If the flow is increased, the necessary pump pressure rises in respect of a given pipe cross section. As a consequence thereof, the pump output has to be increased and the increased pump pressure inevitably warms the cooling medium also. This waste heat must be removed from the cooling medium itself and thus already lessens the cooling capacity at the actual heat source. The available cooling capacity can therefore be increased only underproportionally by raising of the flow.

In the fourth place, with increased flow there is the danger of formation of a turbulent flow in the cooling medium, which increases the necessary pump pressure and thus still further increases the pump output and leads to the described reduction in the available cooling capacity.

In the fifth place, the pipe diameter and the shape of the cross section can often not be freely chosen in practice. The machine elements in question must meet a variety of demands and their conceptual design constitutes the best possible compromise for the optimal satisfaction of these demands. The available space for the cooling circuit is limited and, as a result of the complexity of the elements, is subject to various, including above all geometric, restrictions (see cooling lines in FIG. 2).

In the sixth place, the regulation of the temperature of the cooling medium poses a relevant difficulty. A narrow tolerance in relation to the target temperature can only be ensured with complex assemblies, as well as a sensor system, hardware and software for the regulation. Usually, such cooling systems are operated with a so-called two-point controller. This means that the heat sink cools as soon as the upper control point is reached, so that the cooling medium, upon leaving the heat sink, periodically fluctuates in temperature between the lower and the upper control point. For instance, from machining spindles for precision machining, it is known that this type of fluctuation, even if it amounts to just a few degrees Kelvin or even to less than 1 K, already has an adverse effect during use.

In the seventh place, the machine elements cool off during stoppages and, in the case of precision machining, for instance, following resumption of the operation, a warm-up phase is necessary in order to restore a thermally stable operating state.

Fully divorced from the preceding statements, in other technical fields so-called Phase Change Materials (PCMs) are known for their heat absorbency. PCMs are materials which at a defined temperature perform a phase transition and, in so doing, either release or absorb a large quantity of heat. In the midst of the phase transition—for example upon the change of state from solid to liquid—the temperature is not altered by the inflow or outflow of heat. Outwardly, the impression is given that the specific heat capacity of PCM-containing liquids is substantially higher than with conventional cooling mediums. The investigation of PCMs was conducted, above all, in order to acquire a higher storage density for heat, in particular for the storage of solar heat. In addition, PCMs are used in so-called latent heat stores, inter alia in building technology, in order to increase the thermal inertia of buildings and to reduce power peaks. The levelling of periodically occurring temperature fluctuations by means of latent heat stores is also known.

Document EP 2 375 483 A2 discloses, for its part, the use of PCMs as a suspension or emulsion in a cooling medium on a water-free base. This PCM-containing cooling medium is applied in fuel cells, with use being made of the high heat capacity of the PCMs. As a PCM is described anorganic salt in a water-free liquid. Although EP 2 375 483 A2 discloses the use of a dispersion having PCMs as the cooling medium, the document gives no hints or suggestions as to how the stabilization of a fuel cell at a target temperature could be carried out.

Document EP 0 987 799 A2 describes a passive cooling system for the short-term cooling and thermal stabilization of a solid-state laser. The disclosed cooling system uses a solid PCM cooling body, comparable with cooling elements of standard coolboxes. A cooling system having a solid PCM cooling body is functional, however, only for a few minutes and, according to this document, is usable for instance, for the final route guidance of a guided missile. For a continuous operation of the described cooling system, EP 0 987 799 A2 proposes combining the solid-state PCM with a heat exchanger which operates with a cooling liquid. The phase state of the PCM cooling body, or the solid to liquid component, can thereby be favourably influenced. Document EP 0 987 799 A2 also proposes the creation of cooling bodies from various PCM materials.

From Document U.S. Pat. No. 5,141,079, it is known to use cooling lubricants to cool the machining site between the tool and the workpiece on machine tools which contain microencapsulated PCMs as a component. The described cooling lubricants lubricate and, at the same time, cool the tool and the workpiece at the machining site very effectively. This thanks to the heat capacity of the PCMs contained in the cooling liquid. The cooling lubricant here works in an open or external cooling circuit and serves merely to cool the machining site of the workpiece or merely to cool the tip of the milling or turning tool.

SUMMARY OF THE INVENTION

Starting from the known cooling systems and their drawbacks, an aspect of the present invention is to propose an integrated, internal cooling system for machine elements and a closed cooling circuit for corresponding machine elements, which cooling system possesses a substantially better cooling capacity than existing cooling apparatuses. In particular, the cooling system according to the invention is intended to allow within defined operating parameters sufficient cooling of the machine element with low coolant flow and have a very small or no temperature difference between the coolant forward circuit and coolant return circuit at the heat source of the machine element.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DESCRIPTION OF THE PREFERRED EMBODIMENTS

Designated as a dispersion is a fluid mixture which consists of a continuous (enveloping the disperse phase) liquid phase and contains a discontinuous phase. The discontinuous phase can consist, for instance, of solid particles or fibres, in which case reference is made to a suspension. If the discontinuous phase is likewise liquid and consists, for example, of drops, then the term "emulsion" is used. For the present invention, the coolant can contain PCMs in solid as well as liquid form.

Thanks to the inventive application of Phase Change Materials in the coolant of an integrated, internal cooling system of a machine element, a substantially higher and better cooling capacity than in known, conventional cooling apparatuses is obtained. The advantageous effect is described below.

Through the use of a dispersion consisting, for instance, of water and a suitable PCM which performs the phase transition precisely in the region of the target or operating temperature of the machine element, at this target temperature a high heat capacity of the coolant is obtained. As a result, waste heat from the machine element can be absorbed by the dispersion with PCMs without increase in the coolant temperature. Such a dispersion thus constitutes an ideal cooling medium for isothermal applications. The machine element to be cooled can be, for example, a motor spindle in the milling head of a machine tool or a different machine element with heat source.

As a result of the, in relation to water, substantially increased specific heat capacity of the PCM dispersion in the relevant temperature range, it is possible, in comparison to water, on the one hand to achieve increased cooling capacity with lower flow rates, and on the other hand to effect cooling at, moreover, constant temperature. This promotes, moreover, the heat transfer from the surrounding solid body into the coolant, since the temperature difference does not change. Moreover, smaller diameters for cooling lines or cooling ducts can also be chosen or, given the existing pipe diameter, more heat can be transported.

Furthermore, the heat flow into the coolant increases with rising temperature of the heat source, since the coolant itself maintains the target temperature or the phase transition temperature, whereby the driving temperature gradient rises and whereby the cooling effect, as technically desired, becomes stronger.

A further advantage is that the target temperature is assured by the phase transition temperature of the PCM and no complex regulation is required. The regulation of the cooling system or of the cooling circuit must merely ensure that, at the heat sink, the latent region of the PCM is not fallen below (which, on the other hand, in certain embodiments can even be desirable).

In an ideal case, the coolant liquid consisting of a PCM-containing dispersion enters the heat source in a state in which almost all PCM solid particles are frozen and exits the heat source in the state in which almost all PCM particles are molten.

In a preferred embodiment, the transfer of the coolant to the sensitive behaviour at the lower end of the phase transition temperature range can be directly utilized as an input variable for the regulation of the cooling capacity at the heat sink. For this purpose, the heat sink has a measuring apparatus for the temperature of the coolant and a regulating apparatus for adjusting the cooling capacity at the heat sink. In the cooling of the coolant in the heat sink (heat exchanger) of the cooling circuit, the latent region of the coolant can also be vacated at a lower temperature than the phase transition temperature. Upon the subsequent entry of the coolant via the cooling lines of the cooling circuit into the heat source of the machine element, the latent phase transition region is rapidly reached again, so that the (iso) thermal stabilization by the temperature of the phase transition is active. The coolant flow of the heat sources is in this case preferably designed such that initially heat sources are cooled which may also be cooled beneath the actual target or operating temperature, and only afterwards is the coolant supplied to those heat sources which are intended to be kept at] or cooled to their target operating temperature. The dispersion or the PCM is here designed or chosen such that the phase transition temperature corresponds to the target temperature. Preferably PCMs which have a low hysteresis in the region of the phase transition temperature and remain stable over many cycles are selected.

Where such a dispersion with PCM is used, an integrated, internal cooling system of a machine element, in particular for a machining spindle in a machine tool, or a closed cooling circuit, can be designed such that the critical elements of the machine element, such as, for instance, the spindle bearings, can all be cooled to the desired target temperature or phase transition temperature. The temperature differences within the machine element or spindle can thereby be virtually eliminated, whilst in a conventional solution a temperature difference inevitably exists between the forward and return circuit of the machine element cooling system. According to the invention, the machine element, or desired regions hereof, can be kept approximately isothermal.

A special case arises if the waste heat of the heat source is so great that the coolant vacates the latent region of the PCM contained therein and passes over into the sensitive region above the phase transition temperature. In this case, the coolant assumes the function of a traditional cooling medium, such as, for example, water, and the cooling system works conventionally like traditional cooling systems in which the coolant warms up normally as waste heat is absorbed in the sensitive region. Since the inventive PCM dispersion, preferably in its outer, continuous phase, consists of water, no significant deterioration compared to traditional cooling mediums—such as water—is obtained.

In this case, if the temperature of the coolant rises, the heat flow from the heat source also becomes stronger through convection with the ambient air of the heat source. This ensures that a stable state, even if at higher temperature, is obtained once again. For instance, this operating state is expressly allowed if high torques must be delivered at a machine element, such as, for example, a machine spindle, yet no very high accuracy requirements with respect to the machining of the workpiece exist.

Following a return to lower outputs and, at the same time, higher accuracy requirements, the coolant is run via the cooling system or the cooling circuit again—as previously described—in the latent region. In respect of machining spindles of a machine tool, such a case can arise, in particular, in rough machining operations. Here, high torques must be applied, which means that the spindle must be operated in the upper power range. Above all in the motor winding of a motor spindle, considerably more waste heat is generated. In rough machining operations, the demands upon the accuracy of the machining are low, so that a stabilization of the motor spindle at the target temperature or target operating temperature is not necessary. In the normally following finish machining operation, the spindle is operated merely in the lower or medium power range, which means that the waste heat is low, the PCM coolant can be utilized again in the latent region, and the machine element or spindle can also again be accurately and isothermally operated at the target operating temperature.

The cooling of the coolant in the heat sink of the cooling circuit right into the sensitive region allows, moreover, a simple recognition of the lower limit of the phase transition temperature range and thereby ensures that the wholly latent region of the coolant is again available to the heat source or sources for cooling purposes. Likewise, the tendency towards supercooling which can be observed in respect of phase change dispersions can be averted, this without prejudicing the inventive application.

Since the temperature in the lower sensitive region of the coolant with PCMs rapidly drops, this transfer into the sensitive region, in a preferred embodiment of the invention, can be registered and regulated in a simple and cost-effective manner by a control system.

Due to the increased heat capacity at the target temperature or phase transition temperature, an inventive cooling system or cooling circuit can be designed for a lower flow of coolant, whereby it can be more easily implemented, operated with a lower pump output and constructed more cost-effectively overall. Added to which, the cooling is more stable and allows much smaller temperature differences in the heat source.

In the case of a stoppage of the machine and a target or operating temperature above or below the ambient temperature, the high heat capacity in the latent region of the coolant can be utilized to maintain the operating temperature of the respective machine element. For this purpose, the cooling circuit continues to be operated and the machine element is kept at the phase transition temperature of the coolant, even though the heat loss resulting from the pipeline system and heat transfer into the environment can be considerable. Advantageously, the heat sink is then hereupon deactivated but the circulation maintained, so that the heat which is latently present in the cooling medium is used for a certain time to stabilize the machine elements at the target temperature. Should the latent region nevertheless be vacated and should the coolant begin to react sensitively (i.e. the temperature of the coolant falls below the phase transition temperature), then, when operation is resumed, due to the sensitive characteristics of the coolant, the target temperature at phase transition temperature is rapidly reached again. Nor therefore is it a disadvantage, but rather, on the contrary, it is an advantage, if, in the case of a coolant dispersion having an outer phase, for instance, of water, the specific heat capacity is reduced by the inner phase (i.e. the PCM) in the sensitive region. In the warming-up of the machine or of the machine element, this allows the coolant to be rapidly warmed into its latent region, i.e. to be rapidly warmed to the target temperature or to the phase transition temperature.

Further advantages of the solution according to the invention lie in the altogether simpler design and smaller dimensioning of the cooling circuit, i.e. of its pipe system and pump, and also, of course, in the lower energy consumption of the cooling circuit during operation.

The coolant according to the invention consists of a dispersion and preferably has the following features:

In the first place, the outer phase consists of a fluid with lower viscosity, preferably 0.5 to 1000 mPas. The fluid is preferably not easily inflammable, non-toxic and non-corrosive. Oils, glycols and aqueous formulations are preferred. Water is quite especially preferred. The fluid can contain additives additional to the conditioning, which additives, for example, lessen the tendency toward corrosion and ageing or prevent the growth of bacteria (inhibitors, preservatives).

In the second place, the inner phase consists of a product which is only slightly mixable with the outer phase. Accordingly, organic, non-polar mediums are preferred, with preference for paraffins, fatty acids and fatty acid esters.

The melting point of the organic phase preferably has a very narrow melting range at a medium temperature corresponding to the required cooling temperature or the target temperature.

Usable paraffins are, for example N-alkanes having the empirical formula $C_nH_{2n+2}$. Preferably, for the coolant according to the invention, a mixture of heptadecane having the empirical formula $C_{17}H_{36}$ and octadecane having the empirical formula $C_{18}H_{38}$ can here be used.

As an example of a commercially available organic substance is considered the product RT25 HC of the trading company Rubitherm from Berlin, Germany.

An adaptation of the melting characteristics and melting temperature can be made by the purposeful addition of polyhydric alcohols.

In the third place, the emulsifier system consists of surface-active substances which ensure stabilization of the dispersion. For paraffin dispersions, emulsifier systems having an HLB value (Hydrophilic-Lipophilic Balance) of 8 to 15 are preferred. Preference is here given to mixtures of the following substances: sorbitan stearate, sorbitan monooleate, glyceryl monostearate, and partially ethoxylated alcohols.

Preferably, for the embodiment according to the invention, a selection of two emulsifiers is used, one of which, at as accurately as possible the desired target or cooling temperature, has solid-liquid phase change, and the other of which has a slightly higher melting point. A particularly preferred emulsifier is here constituted by polyoxyethylene sorbitan monostearate. This emulsifier is available from ICI under the brand name Tween 60, or from Kolb AG under the brand name Kotilen-S/1.

Likewise preferred is polyoxyethylene (6) cetyl stearyl ether, available under the brand name Cremophor A6 from BASF AG, or under the brand name Imbentin-AG/168S/060 from Kolb AG.

In the fourth place, the disperse phase can contain further components, in particular of the kind which serve to reduce the supercooling. Higher-melting, organic, non-polar substances are preferred. The aim is to achieve that the higher-melting component is present in low concentration, always frozen, within the operating range (target temperature) and thus constitutes a seed for the crystallization of the actual disperse phase.

Unlike as proposed in the literature, preferably no very similar substances are chosen for this. Preferably, therefore, no long-chain n-alkanes if the disperse phase consists mainly of short-chain n-alkanes. Reason: There is here the danger that a mixing effect leads to an increase in the melting temperature of the actual disperse phase and/or to a lowering of the melting temperature of the substance intended as the crystallization seed. Preferably, higher-melting substances from the class of fatty acids, fatty acid esters are chosen in this case. Palmitic acid or myristic acid is suitable, for instance.

A closed cooling circuit according to the invention is of schematically identical construction as the cooling circuit 24 from FIG. 1, yet differs, on the one hand, in terms of the inventive coolant which is used and, on the other hand, in terms of specific measuring, regulating and conveying means. As will be stated below, differences in relation to traditional cooling systems can exist in terms of the cooling mechanism, the circulation pump, measuring devices for the feed pressure or the coolant temperature—which can be measured at various places.

In the invention, the coolant temperature is preferably measured both at the coolant inflow, and at the coolant outflow of the machine element—for example motor spindle or other electromechanical drive—and also at the entrance, at the exit, or at various places within the heat exchanger (heat sink).

Below, the invention and the inventive concept are described with reference to schematic figures. Various embodiments are also shown. It should expressly be pointed out, however, that the invention and the inventive concept are not limited to these described examples.

Figure 3:
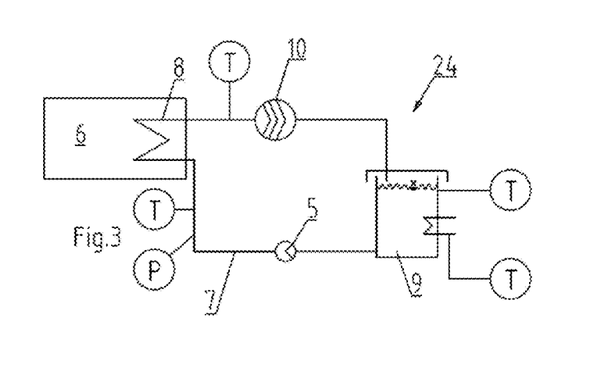
FIG. 3 shows a preferred embodiment of the closed cooling circuit according to the invention.

The schematic representation in FIG. 3 shows a preferred embodiment of the closed cooling circuit 24 according to the invention. This has a coolant pump 5—for example a circulation pump—for conveying the cooling medium in cooling lines 7, which pump is preferably disposed, in the direction of flow of the coolant, before the machine element 6—for example machine spindle. The feed volumetric flow rate is dependent on the necessary cooling capacity for the internal cooling system 8 of the machine element 6 to be cooled. For the invention, circulation pumps are preferably used. Delivery rates of 1 to 15 l/min, preferably 4 to 10 l/min, are conceivable.

Circulation pumps 5 of this type are preferably of variable-speed construction in order to provide volumetric flow rates which are adapted according to the required output.

In a preferred embodiment of the invention, the working pressure which is to be produced by the circulation pump (exit pressure from the pump=entry pressure into the machine element or motor spindle) can be measured and regulated by means of a pressure gauge. The pressure is here a function of the viscosity of the coolant and of the volumetric flow rate and usually follows the construction-specific pump characteristic curve. In principle, the pressure rises with increasing volumetric flow rate, since, with increased flow velocity of the coolant in the cooling lines and in the machine element to be cooled, the flow resistance rises.

Accordingly, an adapted volumetric flow rate, which on the one hand guarantees sufficient cooling of the machine element 6 or of the machine spindle by means of an internal cooling system 8, but is otherwise not unnecessarily large, is advantageous.

If larger volumetric flow rates are necessary, with consequential higher pressures, then the speed of the coolant pump 5 is increased. For the invention, pumps of simple construction are preferred, such as, for example, centrifugal pumps.

Only a part of the electrical energy of the motor of the circulation pump can actually be converted into volume work (pressure and volumetric flow rate). A considerable part of the pumping work is dissipated, i.e. vacates the pump 5 as waste heat in the coolant. The dissipation or waste heat is generated during the pumping process by shearing forces and friction in the coolant itself, primarily at the impeller and at the routing devices within the pump 5.

In connection with the requirement with respect to the stability of the emulsion, it is now advantageous to design the circulation pump 5 such that the nature and location of the generated shearing forces is such that a dispersion of the emulsion takes place. Any disturbances of the emulsion, such as, for example, a drop growth, can be remedied again during passage of the coolant 4 through the pump 5. The level of the necessary shearing forces depends on the general stability of the emulsion, and, in particular, on the emulsifier system.

In a preferred embodiment of the invention, a dispersing unit 10 is connected downstream of the machine element 6 to be cooled (see FIG. 3). In a variant hereof, the dispersing unit 10 possesses a pumping stage and a dispersing stage (according to FIG. 5).

Preferably the circulation pump 5 is configured unchanged in relation to current standard versions and the normally arising shearing forces are sufficient to guarantee an effective redispersion.

Figure 4:
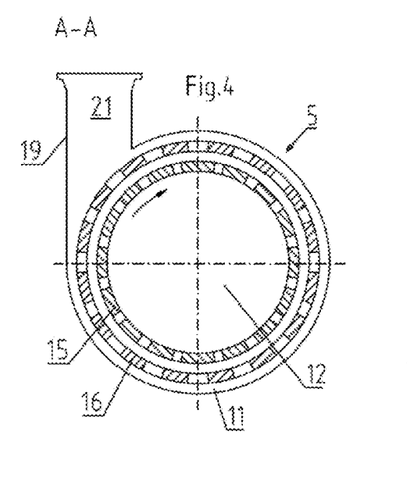
FIG. 4 is a cross sectional view of a circulation pump.

In a further variant represented in FIG. 4, the circulation pump 5 or its pump casing 19 is constructed with a stator 11 with toothed rim 16 and a therein rotating rotor 12 with rotor rim 15. The toothed rim 16 of the stator 11 is also realized on the delivery side 21 of the pump 5, so that also increased shearing forces are generated at the outlet from the pump.

Figure 5:
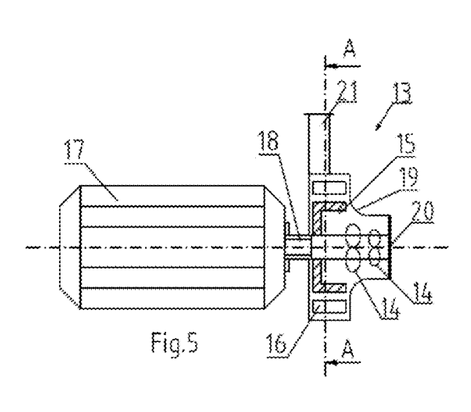
FIG. 5 is a view of a centrifugal pump.

In a quite especially preferred variant represented in FIG. 5, a centrifugal pump 13 which has been optimized specifically for this application is used as the pump: This centrifugal pump 13 possesses a multistage pump vane 14, which supplements the actual rotor wheel 12 of the centrifugal pump 13. This rotor wheel 12 possesses a rotor rim 15. The rotor toothed rim 15 is arranged concentrically in a stator rim 16 so as to be able to rotate. The outer diameter of the rotor 12 and the inner diameter of the external stator 11 are barely different, so that a narrow shear gap is realized. Preferably, a gap of 0.5 to 1 mm, and thus a difference of 1 to 2 mm in the diameter of the rotor 12 and stator 11, is provided. The yet to be chosen outer diameter of the rotor 12 is dependent on the speed of the pump 13. It is preferably chosen such that the relative velocity of the rotor 12 in relation to the stator 11 lies between 5 m/s and 40 m/s. In order not to let the released energy become too large, a relative velocity of 5 to 15 m/s is preferably used.

As represented schematically in FIG. 5, the centrifugal pump 13 is driven by a drive 17 (electric motor), which, via a drive shaft 18, drives the rotor 12 and the multistage pump vanes 14. Also represented are the pump casing 19, the pump inlet 20 and the pump outlet 21 of the centrifugal pump.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

This application claims the benefit and priority of European Patent Application No. 14 170 049.2 filed on May 27, 2014, the entire disclosure of which is incorporated herein by reference.

KEY 1 cooling compressor
2 temperature monitor
3 flow monitor
4 coolant, cooling medium, PCM
5 coolant pump, circulation pump
6 machine element, motor spindle
7 cooling lines
8 integrated, internal cooling system or built-in spindle cooling apparatus
9 heat sink, cooling apparatus
10 dispersing unit
11 stator
12 rotor
13 centrifugal pump
14 multistage pump vanes
15 rotor rim
16 stator rim
17 drive or motor, centrifugal pump
18 drive shaft
19 pump casing
20 pump inlet, pump suction side
21 pump outlet, pump delivery side
22 coolant inflow
23 coolant outflow
24 closed cooling circuit

What is claimed is:

1. A machine element for performing work on a workpiece, comprising:
    the machine element having various components therein with a desired target operating temperature;
    a heat source; and
    an integrated closed loop internal cooling system having a dispersion unit connected downstream from the machine element for cooling the heat source using a coolant flowing throughout the closed loop system and through cooling lines in the machine element, the machine element having at least one coolant inflow and at least one coolant outflow,
    wherein the coolant is a dispersion including at least one Phase Change Material (PCM) having a phase transition temperature at the desired target operating temperature, and
    wherein the integrated close loop internal cooling system is designed such that the cooling system, in a lower and medium performance range of the machine element, provides a cooling of the machine element to the desired target operating temperature, which is in the solid-liquid phase transition temperature range of the Phase Change Material (PCM) contained in the coolant, and if the medium performance range of the machine element is exceeded, the cooling system cools the machine element by warming the coolant above the phase transition temperature range.

2. The machine element with integrated, internal cooling system according to claim 1, wherein the dispersion consists of an aqueous continuous phase and an organic discontinuous phase, wherein the discontinuous phase consists of the Phase Change Material (PCM), which performs a solid-liquid phase change in a phase transition temperature range from 18 to 28° C.

3. The machine element with integrated, internal cooling system according to claim 1 wherein an outer phase of the dispersion consists of a fluid with low viscosity preferably 0.5 to 1000 mPas, wherein the outer phase includes an oil, a glycol or an aqueous formulation, and also contains additives including inhibitors or preservatives, which minimize corrosion and ageing or reduce bacteria growth.

4. The machine element with integrated, internal cooling system according to claim 1 wherein an inner, discontinuous phase of the dispersion, which constitutes the Phase Change Material (PCM), includes an organic, non-polar medium, preferably a paraffin, a fatty acid or a fatty acid ester, and the organic, non-polar medium preferably has a melting point, or a phase transition temperature, which lies at a desired cooling temperature of the machine element, wherein the melting point of the organic, non-polar medium lies in a temperature range from 18 to 28° C.

5. The machine element with integrated, internal cooling system according to claim 1 wherein the Phase Change Material (PCM) consists of one of or a combination of paraffins having an empirical formula $C_nH_{2n+2}$, heptadecane having an empirical formula $C_{17}H_{36}$ or octadecane having an empirical formula $C_{18}H_{38}$.

6. The machine element with integrated, internal cooling system according to claim 1 wherein the coolant dispersion contains a stabilization emulsifier system of surface-active substances, including an emulsifier system having an HLB value (Hydrophilic-Lipophilic Balance) of 8 to 15 is used, wherein the emulsifier system contains one, or a mix of at least two of the following substances: —sorbitan stearate, —sorbitan monooleate, —glyceryl monostearate, —partially ethoxylated alcohols.

7. The machine element with integrated, internal cooling system according to claim 6, wherein the emulsifier system contains first and emulsifiers, wherein the first emulsifiers performs a solid-liquid phase change, and the second emulsifier has a higher melting point, wherein the first or second emulsifier is a polyoxyethylene sorbitan monostearate or a polyoxyethylene (6) cetyl stearyl ether.

8. The machine element with integrated, internal cooling system according to claim 1 wherein the coolant dispersion contains further components having a melting temperature which lies above a phase transition temperature of the Phase Change Material (PCM), said components including organic, non-polar substances from a class of fatty acids or fatty acid esters, palmitic acid or myristic acid.

9. The machine element with integrated, internal cooling system according to claim 1 wherein the machine element is a machining spindle of a machine tool.

10. A closed cooling circuit containing a machine element with integrated, internal cooling system according to claim 1 wherein the cooling circuit has at least one pump and at least one heat sink, which extracts heat from the coolant, wherein the cooling circuit is connected via cooling lines, preferably pipelines, to the coolant inflow and the coolant outflow of the machine element such that the cooling circuit is of closed configuration.

11. Closed cooling circuit containing a machine element with integrated, internal cooling system according to claim 10, wherein the heat sink can cool the coolant so strongly in the course of the heat exchange that the coolant, which contains at least one Phase Change Material (PCM) reaches the sensitive region beneath the phase transition temperature of the dispersion, preferably the closed cooling circuit has for this purpose a regulating and temperature measuring apparatus at the heat sink in order to keep the coolant temperature constant.

12. Closed cooling circuit containing a machine element with integrated, internal cooling system according to claim 10 wherein the coolant, following cooling in the heat sink, flows via the coolant inflow into the internal cooling system of the machine element and firstly cools a heat source, which may at least partially be cooled to a temperature beneath the phase transition temperature of the dispersion, wherein the coolant, upon exit from this heat source, has preferably reached the phase transition temperature.

13. Closed cooling circuit containing a machine element with integrated, internal cooling system according to claim 10 wherein the closed cooling circuit and the internal cooling system of the machine element are designed such that, in the event of a stoppage of the machine element, the heat sink of the closed cooling circuit can be deactivated and the latent thermal energy stored in the coolant prolongs the maintenance of the temperature of the machine element at phase transition temperature.

14. Closed cooling circuit containing a machine element with integrated, internal cooling system according to claim 10 wherein the pump of the cooling circuit is designed such that the pump ensures a constant mix of the dispersion in the coolant.

15. Closed cooling circuit containing a machine element with integrated, internal cooling system according to claim 10 wherein the pump of the cooling circuit is constructively designed such that the pump promotes the emulsification of liquid components of the coolant emulsion or a redispersion of the discontinuous phase of the coolant suspension.

16. Closed cooling circuit containing a machine element with integrated, internal cooling system according to claim 10 wherein the, preferably variable-speed, pump is a circulation pump, which is preferably disposed, in the direction of flow of the coolant, before the machine element to be cooled, the coolant delivery rate of the pump amounting to 1 to 15 l/min, particularly preferably 4 to 10 l/min.

17. Closed cooling circuit containing a machine element with integrated, internal cooling system according to claim 10 wherein the pump is embodied as a stator with stator rim having a therein rotating rotor with rotor rim, wherein the outer diameter of the rotor and the inner diameter of the stator differ by less than 4 mm, preferably 1 to 2 mm, the stator rim preferably extends also in the region of the pump outlet of the pump, particularly preferably the pump is embodied as a centrifugal pump and additionally has a multistage pump vane.

18. Closed cooling circuit containing a machine element with integrated, internal cooling system according to claim 10 wherein a dispersing unit is connected downstream of the machine element, the dispersing unit preferably possessing a pumping stage and a dispersing stage.

19. Closed cooling circuit containing a machine element with integrated, internal cooling system according to claim 18, wherein the dispersing unit is integrated in the heat sink, the dispersing unit preferably being itself installed in a storage container in front of the coolant tank of the heat sink or in the coolant tank of the heat sink.

20. Closed cooling circuit containing a machine element with integrated, internal cooling system according to claim 10 wherein the closed cooling circuit is designed such that between the coolant inflow and the coolant outflow of the coolant at the heat source of the machine element, a temperature difference of less than 1K arises.

21. The machine tool containing at least one machine element with integrated, internal cooling system according to claim 1.

22. A Machine tool according to claim 21, wherein the machine tool has a closed cooling circuit according to claim 10.

23. The machine element according to claim 1 wherein the machine element comprises a motor spindle or an electromechanical drive unit.

24. Apparatus for performing work on a workpiece, comprising:
    a machine element having various components therein with a desired target operating temperature;
    a closed loop cooling system for maintaining the machine element at the target temperature,
    said closed loop cooling system having cooling lines flowing through:
        the machine element;
        a heat sink;
        a dispersion unit connected downstream from the machine element and in between the machine element and the heat sink; and
        a pump;

a dispersion in the cooling lines, the dispersion including at least one Phase Change Material (PCM) having a phase transition temperature at the desired target operating temperature; and a temperature sensor for sensing the temperature of the dispersion in the heat sink, the heat sink being activated or deactivated as a function of the temperature sensed by the temperature sensor, wherein the PCM changes from a solid to liquid or from liquid to solid at the phase transition temperature, depending on the operating condition of the machine element, to maintain the components therein at the desired operating temperature.

\* \* \* \* \*